No. 775,460. Patented November 22, 1904.

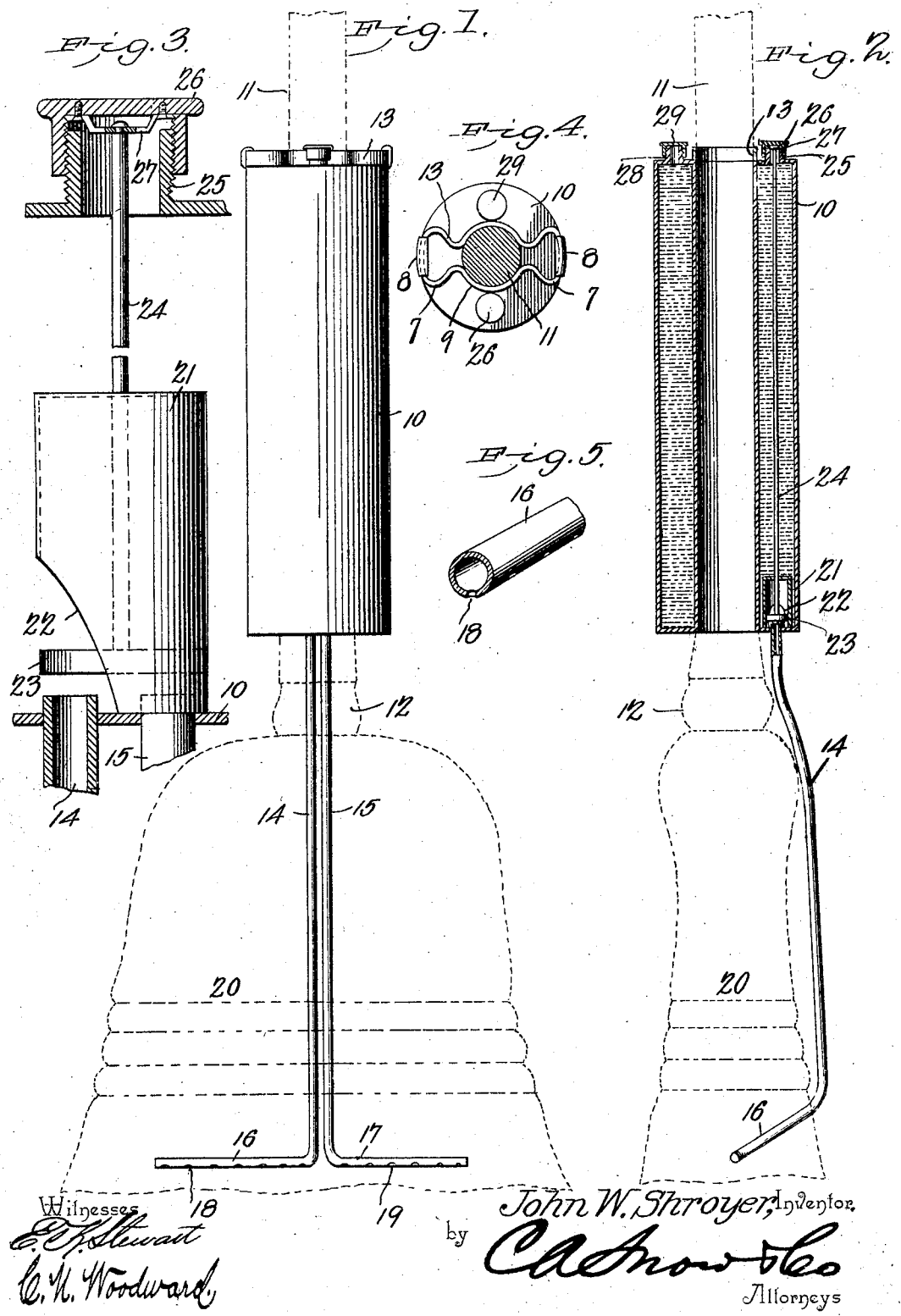

UNITED STATES PATENT OFFICE.

JOHN W. SHROYER, OF BETHANY, MISSOURI.

FOUNTAIN ATTACHMENT FOR BROOMS.

SPECIFICATION forming part of Letters Patent No. 775,460, dated November 22, 1904.

Application filed March 20, 1903. Serial No. 148,780. (No model.)

*To all whom it may concern:*

Be it known that I, JOHN W. SHROYER, a citizen of the United States, residing at Bethany, in the county of Harrison and State of Missouri, have invented a new and useful Fountain Attachment for Brooms, of which the following is a specification.

This invention relates to attachments for brooms for preventing the rising of dust while sweeping, and has for its object to simplify and improve devices of this character; and the invention consists in certain novel features of construction, as hereinafter shown and described, and specified in the claim.

In the drawings illustrative of the invention, in which corresponding parts are denoted by like designating characters, Figure 1 is a front elevation of the same with the broom-head partially in section. Fig. 2 is a sectional side elevation of the device applied to a broom-head. Fig. 3 is an enlarged sectional detail of the controlling-valve and its operating mechanism. Fig. 4 is a plan view of the attachment. Fig. 5 is a perspective view, enlarged, of a portion of one of the spray-tubes.

The improved device consists of a tank or reservoir 10, having a central longitudinal aperture adapted to receive the broom-handle 11 and resting upon the upper end of the broom-head 12. The upper end of the tank is provided with diametrically opposite clips or securing devices 8, by means of which a spring-clamp 13 is mounted upon the upper side of said tank. This spring-clamp may be described as being composed of looped ends 7, connected by an intermediate bulging portion 9, which surrounds and engages the handle 11 where it emerges from the tank-aperture, bearing against said handle with sufficient force to connect the tank detachably with the handle, the spring having sufficient strength to resist all ordinary strain to which the tank will be liable when in use, while it will readily yield when it shall be desired to detach the tank from the handle.

Leading from the bottom of the tank at one side are spaced conduits 14 15, the upper ends relatively close together and extending downwardly and terminating in lateral extensions 16 17, the latter having a plurality of spaced spray-apertures 18 19 and adapted to be embedded among the straws of the broom-head below the lower binding-cords (indicated at 20) and as usually employed in brooms.

Inclosing the upper ends of the conduits 14 15 within the tank 10 is a small tube 21, having a transverse aperture 22 in one side to admit the water and forming a guide for a piston-valve 23, as shown. The stem 24 of the valve extends upwardly through the top of the tank and is surrounded where it emerges by a threaded tubular extension 25, the latter having a threaded cap 26. The upper end of the stem 24 terminates beneath the cap 26 and is connected thereto by a depending metal loop 27, in which the stem is rotatively connected, as indicated. By this means the rotation of the cap 26 will move the stem and valve and seat and unseat the latter upon the upper ends of the conduits 14 15, and thus control the flow therethrough from the interior of the tank.

It will be obvious that by this simple arrangement a spray of water may be discharged into the interior of the broom-head to moisten the broom-straws, which moisture will be imparted to the dust and prevent it from rising, and the flow be entirely under the control of the operator by merely rotating the screw-cap 26.

The tank will be supplied with an inlet 28, provided with a closure 29, through which the tank will be supplied. It will be noticed that the bulging handle-engaging portion of the spring-clamp 13 is disposed between the cap 26 and the closure 29 of the inlet 28, thereby preventing undue expansion of said spring-clamp.

The device is very simple in construction, easily applied to any broom, and readily transferable from a worn out broom to a new one or from one broom to another and will be very effective for the purposes enumerated.

The tank may be of any required size and of any suitable material and may be ornamented in any desired manner.

Having thus described the invention, what I claim is—

In a device of the class described, an annular tank, clips at the upper end of said tank, disposed at the outer edges and at diametrically opposite sides thereof, and a spring-clamp permanently engaging and connected with said clips, said clamp comprising end loops connected with said clips and an intermediate bulging handle-engaging portion which is in alinement with the central aperture of the tank and adapted to frictionally engage a broom-handle passing through the same.

In testimony that I claim the foregoing as my own I have hereto affixed my signature in the presence of two witnesses.

JOHN W. SHROYER.

Witnesses:
J. A. TEMPLEMAN,
W. C. HEASTON.